US007985483B2

(12) United States Patent
Klenk

(10) Patent No.: US 7,985,483 B2
(45) Date of Patent: Jul. 26, 2011

(54) DIGITAL PRINTING OF LOW VOLUME APPLICATIONS

(75) Inventor: Karl-Michael Klenk, Mesa, AZ (US)

(73) Assignee: SmartHealth, Inc., Phoenix, AZ (US)

( * ) Notice: Subject to any disclaimer, the term of this patent is extended or adjusted under 35 U.S.C. 154(b) by 997 days.

(21) Appl. No.: 11/560,623

(22) Filed: Nov. 16, 2006

(65) Prior Publication Data

US 2008/0118746 A1 May 22, 2008

(51) Int. Cl.

| | |
|---|---|
| ***B32B 27/08*** | (2006.01) |
| ***B41M 5/00*** | (2006.01) |
| ***B41M 5/40*** | (2006.01) |
| ***B05D 1/32*** | (2006.01) |
| ***B05D 5/00*** | (2006.01) |
| ***B65B 61/02*** | (2006.01) |

(52) U.S. Cl. .................... 428/515; 428/32.1; 428/32.38; 428/32.39; 427/466; 427/197; 53/411; 53/452; 53/455; 53/456

(58) Field of Classification Search ........................ None
See application file for complete search history.

(56) References Cited

U.S. PATENT DOCUMENTS

| | | | | |
|---|---|---|---|---|
| 3,480,580 | A | 11/1969 | Joyner et al. | |
| 4,567,223 | A | 1/1986 | Ames | |
| 5,450,788 | A | 9/1995 | Shan | |
| 6,013,353 | A | 1/2000 | Touhsaent | |
| 6,051,305 | A | 4/2000 | Hsu | |
| 6,180,304 | B1 * | 1/2001 | Bourdelais et al. | 430/64 |
| 6,310,134 | B1 | 10/2001 | Templeton et al. | |
| 6,383,450 | B1 | 5/2002 | Lasson et al. | |
| 6,793,859 | B2 | 9/2004 | Emslander et al. | |
| 6,811,253 | B1 | 11/2004 | King et al. | |
| 6,951,377 | B2 | 10/2005 | Knoerzer et al. | |
| 6,960,384 | B2 | 11/2005 | Amberkar et al. | |
| 2002/0052439 | A1 | 5/2002 | Farooq | |
| 2003/0173716 | A1 | 9/2003 | Lu | |
| 2003/0218269 | A1 | 11/2003 | Maeda et al. | |
| 2005/0100687 | A1 | 5/2005 | Dutton et al. | |
| 2005/0174412 | A1 | 8/2005 | Codos et al. | |
| 2005/0181118 | A1 | 8/2005 | Janssen et al. | |
| 2005/0245651 | A1 * | 11/2005 | Cooper | 524/270 |
| 2007/0087189 | A1 * | 4/2007 | Cooper | 428/336 |

* cited by examiner

*Primary Examiner* — Sheeba Ahmed
(74) *Attorney, Agent, or Firm* — Reinhart Boerner Van Deuren s.c.

(57) ABSTRACT

A method of coating low density polyethylene (LDPE) and linear low density polyethylene (LLDPE), or combinations of the two, is disclosed. The method includes treating the polyethylene with a coating and then digitally printing the coated polyethylene substrate. The coated substrate may then be over-coated to protect the printing and the substrate may be formed as desired. The coated substrate may also be coated with a clear thin protective coating and heat-sealed on three sides to form a small tote bag.

25 Claims, 1 Drawing Sheet

DIGITAL PRINTING OF LOW VOLUME APPLICATIONS

FIELD OF THE INVENTION

The present invention relates generally to digital printing, and to compositions and techniques for economical printing of low volumes of items.

BACKGROUND OF THE INVENTION

The art of printing has been transformed by the advent of digital printers. A digital printer may be described as a printing device which responds to digital signals. Digital printers and their associated equipment allow for the convenient preparation and storage of data for printing at the time of preparation or for later printing. Digital printers include a broad range of devices, from a small desk-top ink jet printer to elaborate, high speed, web-fed commercial printers.

An advantage of digital printing is that a separate physical medium is not needed to transfer the printing indicia or ink from the medium to the surface that is being printed, e.g., paper or plastic. Thus, in rotogravure or flexographic printing, plates are required to physically transfer the ink from the ink source to the paper or plastic. These plates are very expensive to make, and once made, must be stored and maintained for future runs. Once made, the plates cannot be changed. Thus, non-digital printing options tend to be expensive and also require high runs, many thousands, such as 50,000 or more, in order to be economical.

Digital printing can overcome these disadvantages in cost and convenience, but there can be difficulties, principally in adhering the ink to the printed substrate. Polyvinyl chloride (PVC) is one of the few plastics that are easily printed with conventional inks. Inks do not so easily adhere to other substrates. For example, U.S. Pat. No. 6,951,377 uses an ozonation process to raise the surface energy of a plastic substrate so that ink can more easily adhere to the plastic. This process allows the ink to more easily adhere, but also affects the physical and melting properties of the plastic. In addition, ozone may be a harmful pollutant and people working nearby should be protected from exposure to high ozone levels.

It is clear that ink will more easily adhere to substrates that are absorbent, such as paper or fiber, rather than less expensive plastic. One alternative is to use more expensive layers of plastic, as described in U.S. Pat. No. 6,793,859. This patent describes a printing substrate made with a core layer of polyester, polycarbonate, or other resin, and an image receptive layer. The image-receptive layer is made by extruding a carrier resin with an ink absorptive resin. The ink absorptive resin is preferably a copolymer of methylmethacrylate and other acrylates. This is an not only an expensive process, but also a time-consuming specialty chemical process as well.

U.S. Pat. Appl. Publ. 2003/0173716 also supplies a substrate that more easily accepts an ink layer. This application forms a better substrate by blending a coloring agent with a polyolefin film, which is then extruded and oriented with conventional extrusion and orientation equipment. The resulting film may be made in as many layers of as many colors as desired. Making and storing rolls of film by this process will require a large inventory to meet customer demand for the particular desired colors. In addition, the requirement for blending, extruded, and orienting the material adds to the cost of the process.

An alternative to these processes is to acquire or print a roll of film in the desired color and to print the roll or a large quantity of items with some of the desired features in the desired colors, such as a background or sales logo. When the need arises, the remainder of the desired printing, such as information concerning the dates of a particular sale, or the particular items offered, may be printed in the desired small quantity. This technique could require carrying a substantial inventory of pre-printed rolls, and also requires two printing operations rather than one.

There is a substantial need for color printed materials in relatively small volumes. As noted, conventional printing can satisfy the needs of customers with demands for high volumes of material, such as 50,000 copies or more. What is needed is a better way to digitally print small quantities without the need for extensive processing that alters the basic physical qualities of the material that is being printed, and without the need for a second round of printing.

SUMMARY OF THE INVENTION

In light of the foregoing, there is a demonstrated need for an improved technique for digital printing of relatively low volumes of objects, such as tote bags, without the need for expensive relief plates or for processing that alters the basic physical characteristics of the material being printed.

Accordingly, embodiments of the invention provide an improved primer for adhering of printing ink to substrates, and also an improved method for digital printing of substrates.

One embodiment is a method of coating polyethylene. The method includes a step of coating low density polyethylene, linear low density polyethylene, or combinations of low density and linear low density polyethylene, with a coating, the coating comprising an aqueous dispersion of a copolymer of ethylene and acrylic or methacrylic acid, and a compatible adhesion promoter selected from the group consisting of an aliphatic polyurethane dispersion, a hydrogenated hydrocarbon rosin or rosin ester dispersion, and an amorphous acrylic polymer dispersion. The method then includes steps of printing the coated polyethylene with a digital printer, coating the printed polyethylene with a clear coat, and converting the clear coated polyethylene to a desired form. DP44 may also be used as the coating.

Another embodiment is a coated polyethylene substrate. The substrate is made from low density polyethylene, linear low density polyethylene, or a combination of low density polyethylene and linear low density polyethylene, said substrate having first and second major surfaces, with at least one of said major surfaces having coated thereon a coating of DP44 or a primer coating for enhancing adhesion of liquid toner thereto, said primer coating comprising a mixture of a copolymer of ethylene and acrylic or methacrylic acid and an adhesion enhancer selected from the group consisting of an aliphatic polyurethane, a hydrogenated hydrocarbon rosin or rosin ester, and an amorphous acrylic polymer.

Another embodiment is a method of applying a primer coating to a polyethylene substrate for enhancing adhesion of liquid toner thereto. The method includes steps of providing a substrate made from low density polyethylene, linear low density polyethylene, or a combination of low density polyethylene and linear low density polyethylene having first and second major surfaces, and applying a DP44 coating or a primer coating to at least one of the major surfaces of said substrate; the primer coating comprising a mixture of a copolymer of ethylene and acrylic or methacrylic acid and an adhesion enhancer selected from the group consisting of an aliphatic polyurethane, a hydrogenated hydrocarbon rosin or rosin ester, and an amorphous acrylic polymer.

Another embodiment is a method of printing a polyethylene substrate. The method includes steps of providing a substrate made from low density polyethylene, linear low density polyethylene, or a combination of low density polyethylene and linear low density polyethylene, the substrate having first and second major surfaces, with at least one of the major surfaces having coated thereon a coating of DP44 or a primer coating comprising a mixture of a copolymer of ethylene and acrylic or methacrylic acid and an adhesion enhancer selected from the group consisting of an aliphatic polyurethane, a hydrogenated hydrocarbon rosin or rosin ester, and an amorphous acrylic polymer, and printing the substrate by applying liquid toner from a digital printing apparatus to the coated surface of said polyethylene substrate.

Other features, benefits and advantages of embodiments of the present invention will be apparent from the summary and subsequent description of one or more preferred embodiments, and will be readily apparent to those skilled in the art and having knowledge of digital printing. Such features, benefits and advantages will be apparent from the above as taken in conjunction with the accompanying examples, figures and all reasonable inferences to be drawn therefrom.

DESCRIPTION OF THE DRAWINGS

These and other advantages of embodiments of the present invention are best understood with reference to the drawings, in which.

DETAILED DESCRIPTION OF THE PRESENTLY PREFERRED EMBODIMENTS

Figure 1:
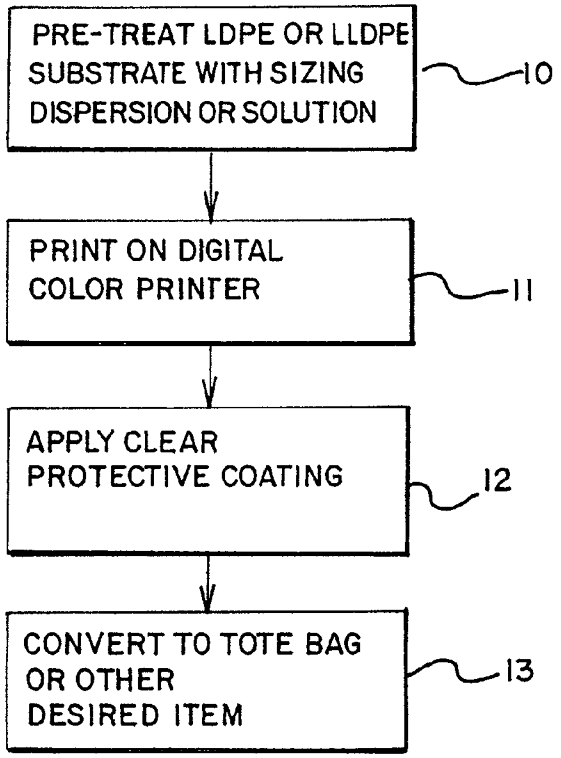
FIG. 1 is a flow-chart for practicing a method embodiment of the present invention.

A number of coatings have been discovered that are superior in preparing and sizing low cost substrates for small runs of digital printing. Digital printing may be described in many ways, one of which is that the printing occurs without a physical image carrier. A physical image carrier, such as an etched plate, is clearly superior for large runs of high volume printing. However, for small runs, of say one or two thousand, or fewer, digital printing may be the most economical method, in spite of its relatively high unit cost. Digital printing may be preferred because the printing itself is the main cost, with no plate preparation, or other high ancillary costs.

By digital printing is meant a process with no physical image carrier, such as an etched plate. Instead, digital printing includes processes such as ink jet printing, thermal transfer, and electrostatic printing. The most common digital printing process is similar to that used in photocopying. A photoconductive drum rotates in a bath of liquid with ink particles. An image of the original document is scanned in a narrow band on the surface of the drum. When light hits the drum, a latent electrical image of the scan is formed on the surface of the drum. The ink is attracted to the drum electrostatically, and the drum then transfers the particles to the substrate to be printed. A separate drum is used for each color. In preferred processes, there may be a single extra color (one spot printing), two extra colors (two spot printing) or full, four-color digital printing.

Another cost of printing is the substrate itself. It has long been recognized that certain relatively expensive materials, including plastics, tend to readily accept inks or coatings, and thus are relatively easy to print on. These include polyvinyl chloride (PVC) and polycarbonate. When the conversation turns to low-temperature polymers, such as polypropylene and polyethylene, and especially cost-effective versions, such as low density polyethylene (LDPE) and linear low density polyethylene (LLDPE), it is generally acknowledged that printing is very difficult.

It is difficult because heat is usually used to cure the ink, or at least to drive off the solvent or water of solution. The heat used to dry the ink adversely affects substrates that have low melting points, such as LDPE polyethylene, and especially LLDPE. Thus, it is very difficult to effectively print on polyethylene, especially LDPE and LLDPE, if the application process requires heat. LDPE includes polyethylene that is typically made by a high pressure free-radical polymerization process. LDPE has a density from about 0.910 to about 0.940 g/cc, and typically has branching on about 2% of its carbon atoms. In contrast, HDPE typically has a minimum density of about 0.945 g/cc. Typical LDPE grades include the LD 051 series from Exxon-Mobil. Some grades include small amounts of ethylene-vinyl acetate copolymer, up to about 6.5 or 7.0 weight percent.

LLDPE typically has a density from about 0.905 g/cc to 0.938 g/cc, although some grades may be as high as 0.965 g/cc, such as Atlantis Plastics (Atlanta, Ga., U.S.A.) AP5212, which is a blend of LDPE and LLDPE. LLDPE is typically made by copolymerization of ethylene with longer-chain olefins, such as butane and hexane. LLDPE typically includes a significant number of short branches. Other commercially available grades of LLDPE include LL1001 series and the LL1107 series from Exxon-Mobil, Houston, Tex., U.S.A., and the L8000 numbers from Huntsman Chemical, the Woodlands, Tex., U.S.A.

Accordingly, there has been an ongoing search for sizings or pre-treatments that will allow digital printing of low cost substrates. Some effective compositions have been found, as described in U.S. Pat. Appl. Publ. 2005/0245651. This application describes coatings that are helpful in printing on heat-sensitive substrates. The coatings are generally aqueous, and include a mixture of a dispersion of a copolymer of ethylene and acrylic or methacrylic acid, along with a compatible adhesion enhancer, an aliphatic polyurethane dispersion, a hydrogenated hydrocarbon resin, or an amorphous acrylic polymer dispersion. The product is sold commercially by Michelman, Inc., Cincinnati, Ohio, U.S.A., under the trade name of DigiPrime® 4431. Because of the good description of the coating product, most of this patent application is set forth herewith in the present application.

The patent application mentioned above discusses applications for a number of substrates, including polypropylene, biaxially oriented polypropylene, polyamide, biaxially oriented polyamide, polyethylene terephthalate, and polyvinyl chloride. It has now been unexpectedly discovered that 2 mil (0.002") thick linear low density polyethylene may been treated with such a coating and will run successfully in a digital printer. Digital printers that are popular include the Hewlett-Packard line of Indigo presses, such as the WS4000 and WS4050 models. Other useful digital printers include those now available from Agfa-Geveart, Mortsel, Belguim, such as their "Dot Factory" printers, and ink jet printers from HP Scitex (formerly known as SciTex Vision), Palo Alto, Calif., U.S.A., and others.

In addition to the discovery of the utility of the Digiprime 4431, other coating products not intended for low temperature polyethylene substrates have also worked well, such as DP44 from Dunmore Corporation. The substrates are preferably films of low density polyethylene (LDPE) and linear low density polyethylene (LLDPE). These substrates have been very difficult to process, as opposed to other substrates, such as polypropylene, or PVC, and also as opposed to other product forms, such as spun-bonded polyethylene. LDPE and LLDPE products have characteristics for printing that are very different from many substrates, including those mentioned above. The invention concerns the use of these unique coatings on only these very unique and difficult substrates. LLDPE is typically a very linear polymer with very short branches, made by copolymerization of ethylene with longer chain olefins, such as butene or hexene. It may be made thinner than LDPE and tends to be have a higher tensile strength and a lower modulus, so that it elongates and flexes more easily. LDPE and sometimes LLDPE is made with a small amount of vinyl acetate copolymer, such as from 0.5 weight percent to about 7 weight percent. The terms LDPE and LLDPE, as used herein, may include a small amount of vinyl acetate or other processing aid that also improves the printing properties of the finished film.

A process for digitally printing low density polyethylene (LDPE) substrates, and especially linear low density polyethylene (LLDPE), is depicted in FIG. 1. The substrate is preferably in the range of about 0.0005 inches (about 0.013 mm) to about 0.0013 inches (about 0.33 mm). The substrate is first treated 10 with the preferred sizing solution or dispersion. The substrate is then printed 11 as desired. A clear protective coating, such as UVF100G from Nicoat, Inc., Bensenville, Ill., is then applied 12 to at least the coated side of the substrate. The substrate is then converted 13 to the desired form or shape. To form a tote bag, the substrate may be cut and folded in half. Three sides may then be heat sealed, and a handle adhered to the top, or a cutout may be made so that a person can easily carry the tote through the cutout. Other forms and other shapes may be made and used, such as flat sheet ads for adhering to another object.

One application of this printing process is to produce customized tote bags in low volume, such as a tote bag given by a doctor or dentist to a patient. A typical order for such tote bags from a practitioner may be from 50-1000 bags. A message from the doctor or dentist, with his or her name and contact information, may be printed onto the totes. A number of stock images may be stored on a computer, such as images associated with seasonal themes or a holiday theme. Such an image may be printed, along with the message, onto a small order of totes. Of course, a number of totes, with different images or themes, may be printed with a single order.

Figure 2:
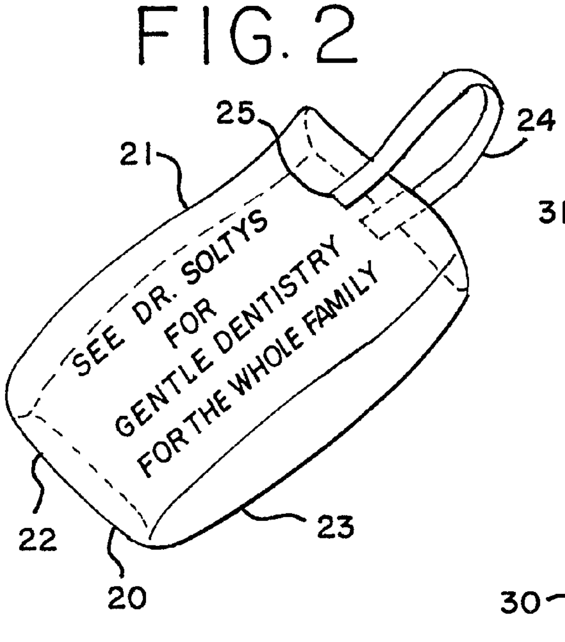
FIGS. 2 and 3 are embodiments of objects that may be made from printing a substrate with subsequent processing.
Figure 3:
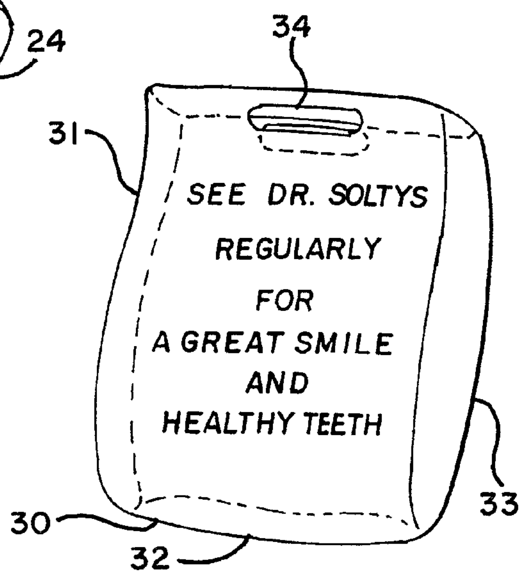

FIGS. 2 and 3 depict examples of totes 20, 30 usefully made from the above-described substrates. The substrate is typically received from a plastics manufacturer in a very long roll of film. A desired amount of plastic is pretreated by unwinding, coating with the desired sizing, and rewinding. The treated film is then printed and rewound, and is then coated with a clear protective coating, and rewound again. The individual totes 20, 30 may be formed by cutting a length of film and heat sealing, or applying adhesive, on three edges, leaving one side open, as shown in FIGS. 2 and 3, with closed edges 21, 22, 23 and 31, 32, 33. A handle 24 may be heat sealed 25 onto tote 20, or cutouts 34 may be made, for easy handling of the tote. The printing on the tote may be for promotional, for advertising, or for reminding a patient of the need for regular care.

The primer coating described herein provides a number of advantages over prior coatings in that it provides enhanced liquid toner adhesion to a number of different polymeric substrates. In addition, the coating does not require the use of any additional primers or precoatings to achieve proper adhesion, and avoids the problems of solvent-based coatings because it comprises a water-based composition.

The primer coating is based on a dispersion of a copolymer of ethylene and acrylic acid or methacrylic acid, which ensures good transfer of the ink image to the substrate. The copolymer exhibits good adhesion to ethylenic polymers as such polymers are typically the binders used in liquid toner compositions. The copolymer should have a sufficient degree of hot tack to ensure that, during printing, the image is removed from the printing blanket under normal operating temperatures (120° C. to 140° C.) when the image is brought into contact with the substrate. Preferably, the copolymer comprises from about 65 to 95 wt % ethylene and from about 5 to 35 wt % acrylic or methacrylic acid. The copolymer may have a number average molecular weight of about 2,000 to 50,000. The copolymer is preferably prepared as a dispersion by heating the solid polymer with a water phase in a pressure reactor in the presence of a base such as ammonia or an alkali such that the base reacts with the acid groups on the polymer, and upon melting, the polymer forms a colloidal dispersion. The primer coating contains from about 60 to 95 wt % of the dispersion containing 35% total solids. A suitable ethylene acrylic acid dispersion for use in the present invention is commercially available from Michelman under the designation Michem®Prime 4990R.E.

While ethylene-acrylic or methacrylic acid copolymers exhibit good ink transferability, generally they do not have sufficient adhesion to nonpolar polymeric substrates such as polypropylene or polyethylene terephthalate. Accordingly, the primer coating further includes an adhesion enhancer which is compatible with the ethylene-acrylic or methacrylic acid copolymer dispersion and which increases adhesion to the underlying substrate without adversely affecting the transfer of the ink image to the substrate. The adhesion enhancer is preferably in the form of a dispersion comprising either a polyurethane, a hydrogenated hydrocarbon rosin or rosin ester, or an amorphous acrylic polymer. Where the coating includes a polyurethane dispersion, the coating preferably includes from about 5 to 40 wt % of the dispersion which contains 33% total solids. A suitable polyurethane dispersion is commercially available from NeoResins under the designation NeoRez® R-600. Other suitable polyurethane dispersions include Incorez 217 from Industrial Copolymer Ltd. and TD7037 or TD7038 from Scott Bader Company Ltd.

Where the toner adhesion enhancer comprises a hydrocarbon rosin or rosin ester dispersion, the coating includes from about 10 to 40 wt % of the dispersion which contains 55% solids. Preferably, a hydrogenated hydrocarbon rosin or rosin ester having a ring and ball softening point in the range of from about 70° C. to 105° C. is used. The rosin or rosin ester dispersion is preferably formed by melting the rosin or rosin ester and then dispersing the polymer in a water phase using surfactants and agitation. A suitable hydrocarbon resin dispersion is commercially available from Eastman Chemical Resins Inc. under the designation Tacolyn 1100. Other suitable hydrocarbon resin dispersions include Tacolyn 3166 and Tacolyn 4187, also available from Eastman Chemical Resins Inc.

Where the toner adhesion enhancer comprises an amorphous acrylic polymer dispersion, the coating may include from about 5 to 40% of the dispersion which contains 35% solids. The dispersion is preferably prepared by dissolving amorphous acrylic polymers in water at elevated temperatures in the presence of ammonia or bases. A suitable amorphous acrylic emulsion is Neocryl BT36 from Neo Resins.

The primer coating of the present invention preferably further contains a wetting agent for reducing the surface tension of the coating to wet out the substrate and to promote flow or leveling of the coating prior to drying. Suitable wetting agents include surfactants and alcohols, such as isopropyl alcohol. Preferred surfactants include nonionic acetylinic glycol-based surfactants such as Dynol® 604 from Air Products. Other suitable surfactants include polyalkylene oxide modified polymethylsiloxanes such as Silwet® L-77 from GE Advanced Materials.

Other optional additives which may be included in the primer coating are matting agents such as amorphous silica, which maintains a matte print surface. Such additives may be present in an amount of from about 2 to 4 wt %. A preferred amorphous silica is Ace-Matt TS 100, available from Degussa. If the substrate used is glossy, higher amounts of silica (up to about 15% by weight) may be used to achieve a matte print surface.

Because the primer coating exhibits a high hot tack, it is desirable to add one or more antiblocking agents to the coating to reduce residual tack when the substrate is rewound after coating and during storage. The antiblocking agents should not interfere with hot tack development and transfer of the ink image to the substrate. Preferred antiblocking agents include crosslinking agents, waxes, silica, metal hydroxides, and mixtures thereof. A preferred crosslinking agent is melamine formaldehyde resin, which may be present in an amount of from about 0.05 to 5 wt %. Other suitable crosslinking agents include sodium hydroxide, potassium hydroxide, zinc oxide, and polyethylene imine (Aziridine).

Suitable waxes include carnauba wax, oxidized polyethylene wax, and montan wax. Preferred for use is a 25% solids carnauba wax emulsion available from Michelman, Inc. under the designation Michem® Lube 160. The wax is preferably included in an amount of from about 4 to 15% by weight of the total dispersion.

Where metal hydroxides are added to the formulation as antiblocking agents, they are incorporated as metal ions to form a partial ionomerization of the ethylene-acrylic or methacrylic copolymer. The metal ions may be selected from Group IA, IIA, or IIB of the periodic table. Preferred for use are sodium or potassium ions in the form of their hydroxides. The hydroxides are included in amount of from about 0.05 to 1% by weight. When such metal hydroxides are used, the primer coating is preferably made by forming two ethylene acrylic acid dispersions; e.g., an ammonia dispersion based on Michem®Prime 4990R.E. and a sodium dispersion based on the same ethylene acrylic acid.

The two dispersions are preferably blended in a ratio of 40 to 100 parts of the ammonia-based dispersion and 0 to 60 parts of the sodium based dispersion along with the remaining components. Water (preferably soft water) may also be added to the primer coating to lower the viscosity of the coating and aid in the flow of the coating. The coating may contain from 0 to 30 wt % of soft water.

Before the primer coating is applied to a polymeric substrate, the surface of the substrate is preferably treated to ensure that the coating will wet out the surface of the film. The film is preferably treated using conventional techniques such as a flame treatment or a high voltage corona discharge treatment.

The primer coating is applied to the polymeric substrate in any suitable manner including gravure coating, roll coating, wire rod coating, flexographic printing, spray coating and the like. The coating composition is preferably applied such that upon drying, the coating forms a smooth, evenly distributed layer of about 0.1 to 2 microns in thickness, and more preferably, from about 0.3 to 0.5 microns in thickness, which imparts the desired printability and adhesion properties to the liquid toner ink and the substrate. After the coating is applied, it may be dried by hot air, radiant heat, or any other suitable means which provides a clear, adherent coated film.

In order that the invention may be more readily understood, reference is made to the following examples from the Michelman application, which are intended to illustrate the invention, but are not to be taken as limiting the scope thereof.

EXAMPLE 1

Several primer coating compositions are prepared in accordance with embodiments of the present invention by mixing the components listed below.

| Component | Wt % of total composition |
|---|---|
| Formulation 1 | |
| ethylene-acrylic copolymer dispersion[1] | 53.7 |
| hydrocarbon rosin ester dispersion[2] | 23.3 |
| isopropyl alcohol | 15.4 |
| soft water | 7.6 |
| Formulation 2 | |
| ethylene acrylic copolymer dispersion[1] | 90 |
| water based polyurethane dispersion[3] | 10 |
| Formulation 3 | |
| ethylene acrylic copolymer dispersion[1] | 80 |
| Water-based polyurethane dispersion[3] | 20 |
| Comparative Formulation 4 | |
| ethylene acrylic copolymer dispersion[1] | 33.5 |
| isopropyl alcohol | 20.0 |
| soft water | 46.5 |
| Formulation 5 | |
| ethylene acrylic copolymer dispersion[1] | 76.5 |
| water-based polyurethane dispersion[3] | 19.1 |
| soft water | 4.0 |
| surfactant[4] | 0.4 |
| Formulation 6 | |
| ethylene acrylic copolymer dispersion[1] | 63.75 |
| water-based polyurethane dispersion[3] | 15.9 |
| soft water | 20.05 |
| Surfactant[5] | 0.3 |
| Formulation 7 | |
| ethylene acrylic copolymer dispersion[1] | 73.4 |
| water-based polyurethane dispersion[3] | 18.4 |
| soft water | 3.82 |
| surfactant[4] | 0.38 |
| wax[6] | 4.0 |
| Formulation 8 | |
| ethylene acrylic copolymer dispersion[1] | 46.7 |
| sodium-stabilized ethylene acrylic acid dispersion[7] | 36.7 |
| water-based polyurethane dispersion | 16.6 |

[1]MP4990R.E. from Michelman.
[2]Tacolyn 1100 from Eastman Chemical Resins Inc.
[3]Neo Rez R-600 from Neo Resins.
[4]Dynol 604 from Air Products.
[5]Silwet 77 from Setre Chemical.
[6]Carnauba wax emulsion ML 160 from Michelman, Inc.
[7]Sodium dispersion based on MP 4900R.E. (20% solids content).

Formulations 1-4 are coated onto a polyethylene terephthalate (PET) film having a surface energy of greater than 53 dynes/cm using a rod coater and applying 4 microns of wet coating. The coatings are dried using hot air at approximately 100° C. All four coated substrates are then printed on a Hewlett-Packard Indigo sheet fed printer using liquid toner ink and may be tested for adhesion of primer to the substrate as well as for the adhesion of toner ink to the primer. The adhesion test is performed after 15 minutes and after 24 hours by applying adhesive tape in accordance with ISO 2409 and removing the tape after 30 minutes. If any film is recorded as a failure; no removal of the toner or coating indicated a pass.

The comparative formulation 4 is the only formulation which failed in Michelman testing. In all other formulations, total adhesion of the film to the primer coating and total adhesion of the toner to the coating is achieved. The results demonstrate that an ethylene-acrylic copolymer dispersion alone, even when used in conjunction with a wetting agent and a high surface energy film, does not achieve sufficient toner adhesion when compared to formulations of embodiments of the present invention.

EXAMPLE 2

Formulations 1, 2, and 3 above are applied to corona discharge treated biaxially oriented polypropylene film (having a surface energy of greater than 40 dynes/cm) using the application method described in Example 1. All four coated substrates are printed on a Hewlett-Packard Indigo series 1000 sheet fed printer and tested for adhesion after 15 minutes and 24 hours. All three printed samples passed the adhesive tape test as described above in the Michelman testing. In a separate test, Comparative Formulation 4 showed adhesive failure to the OPP film when applied under the same conditions.

EXAMPLE 3

Formulation 1 is applied to an opaque polypropylene synthetic paper (obtained from YUPO Corporation) using a flexographic roll coater at a coat weight of 0.7 gm/m$^2$. The coating is dried in-line using infra-red heaters and then rewound. The coated reels are then slit and sheeted. The sheets are printed using a Hewlett-Packard HP Indigo series 1000 sheet fed printer. The printed samples passed the adhesive tape test as described above in the Michelman testing.

EXAMPLE 4

Formulation 5 is applied to YUPO opaque polypropylene synthetic paper under the same conditions as in Example 3 and sheets are printed using a Hewlett-Packard Indigo series 1000 sheet fed printer. The printed samples passed the adhesive tape test as described above in the Michelman testing.

EXAMPLE 5

Formulation 6 is applied using a rod coater onto transparent reels of OPP and PET film that had been corona treated in-line with the coating application. The coating is dried using air flotation dryers at a temperature of 70 C and cooled using a chill roller before rewinding. Tape adhesion tests as described above are carried out on the coated products which passed. The coated products are then printed on a web fed Hewlett-Packard Indigo web fed printer. Adhesion is tested both immediately and after 24 hours using the tape adhesion test. The printed and coated products passed in the Michelman tests described above.

EXAMPLE 6

Formulation 7 is coated onto transparent and white corona treated BOPP films; corona treated opaque polypropylene film; and glossy paper. The coatings are applied using a Cooper Flexo Reflex Coater fitted with IR dryers. The temperature of the web entering the coating machine is 16° C. and after drying, the temperature of the web on rewind is 32° C. The average dry coating weight is calculated at 0.215 grams per m$^2$ for all substrates involved. The adhesion of the primer coating to the substrate is tested immediately off the machine using adhesive tape in accordance with ISO 2409 and removing the tape after 30 minutes. All of the primer coatings passed in the Michelman testing described above.

The coated substrates are then printed on a WS4000 Hewlett-Packard Indigo press fed printer. An uncoated reference film sample of the same BOPP is also printed for comparison purposes.

The print trials tested the following properties: transference, fixing, flaking, print cleaner, memories, and transport. Transference refers to the quality of toner ink transfer to the substrate and the compatibility of the coated substrate to toner, specifically highlight dots, thin lines, and areas of high coverage. A repeated pattern of 5 different print tests is run for approximately 200 linear meters. Any lack of transfer is noted.

Fixing refers to adhesion of the ink to the substrate. A test image prints block areas of color on the substrate, and adhesion of the ink to the substrate is tested immediately and after 1 hour intervals after printing. Reaching 100% adhesion within 15 minutes is considered good.

Flaking refers to the tendency for the ink to flake off the substrate. This test shows the adhesion and flexibility of the substrate-coating-ink interfaces.

Number of print cleanings refers to the number of sheets needed to remove any residual toner ink left on the blanket or photo imaging plate and get a completely clean image. This is done by printing a number of A4 100% yellow images. Ideally, a low number should be used, showing that 100% ink transfer from the blanket to the substrate is occurring.

Memories refers to a stress test conducted to see if a memory of a previous image is transferred to the next substrate. This is another way of testing to see if the coated substrate provides 100% ink transfer from the blanket.

Transport refers to any web feeding problems which occur during printing. The results of the tests are shown below in Table 1, below.

TABLE 1

| Film | Transference: High-light dot | Transference: thin lines | Transference: high coverage | Fixing: 15 min. | Fixing: 60 min. | Flaking | # print cleans needed | Memories | Paper transport | Remarks |
|---|---|---|---|---|---|---|---|---|---|---|
| Transparent BOPP | Pass | Pass | Pass | 100% | 100% | None | 1 | None | Pass | Immediate adhesion 100% |
| Opaque BOPP | Pass | Pass | Pass | 100% | 100% | None | 1 | None | Pass | Immediate |

TABLE 1-continued

| | Transference | | | | | | # | | | |
|---|---|---|---|---|---|---|---|---|---|---|
| Film | High-light dot | thin lines | high coverage | Fixing 15 min. | Fixing 60 min. | Flaking | print cleans needed | Memories | Paper transport | Remarks |
| | | | | | | | | | | adhesion 100% |
| Opaque PP | Pass | Pass | Pass | 100% | 100% | None | 1 | None | Pass | Immediate adhesion 85% |
| Glossy Paper | Pass | Pass | Pass | 100% | 100% | None | 1 | None | Pass | Immediate adhesion 85% |

All of the coated substrates exhibited excellent printability on the HP Indigo WS4000 printer with the exception of the uncoated reference sample, which was found to be unprintable, i.e., no print was transferred to the sample.

EXAMPLE 7

Formulations 7 and 8 are printed on three different films by direct gravure printing. The films are biaxially oriented polypropylene (BOPP); and polyethylene terephthalate (PET). The coated substrates are printed on an HP Indigo Press WS4000 printer with ElectroInk Mark 4.0 (HP Indigo). Substrate transport is very good. No problems are found with friction, stickiness, or electrostatics. The ink transferability is excellent during the overall test. No fails in ink transfer were found in previous Michelman testing until the blankets reached more than 50,000 separations. The cleaning pages and cleaning monitors indicated that the blankets were free from ink residue or background images for the majority of the test. The blankets were found to be free from printing memories or ghosts up to at least 25,000 separations. The adhesion of the primer and toner ink on the substrate was excellent. The Michelman tests were conducted using a peeling test procedure with 3M 610 tape.

Although the foregoing description has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the invention.

The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled. All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter in the claims as permitted by applicable law. Moreover, any combination of the above-described elements in all possible variations thereof is encompassed by the invention unless otherwise indicated herein or otherwise clearly contradicted by context.

What is claimed is:

1. A method for coating polyethylene, the method comprising:

coating linear low density polyethylene with a coating, the coating comprising an aqueous dispersion of a copolymer of ethylene and acrylic or methacyrlic acid, and a compatible adhesion promoter selected from the group consisting of an aliphatic polyurethane dispersion, a hydrogenated hydrocarbon rosin or rosin ester dispersion, and an amorphous acrylic polymer dispersion;

printing the coated polyethylene with a digital printer;

coating the printed polyethylene with a clear coat; and converting the clear coated polyethylene to a desired form.

2. The method of claim 1, wherein the step of converting comprises sealing the clear coated polyethylene on three edges to form a tote.

3. The method of claim 1, wherein the coating further includes a wetting agent.

4. The method of claim 3 wherein said wetting agent is selected from the group consisting of alcohols and surfactants.

5. The method of claim 1, wherein the coating further includes a matting agent.

6. The method of claim 5 wherein said matting agent comprises amorphous silica.

7. The method of claim 1, wherein the coating further includes an antiblocking agent selected from the group consisting of crosslinking agents, waxes, silica, metal hydroxides, and mixtures thereof.

8. The method of claim 7, wherein the coating comprises from about 0.05 to about 1.0% by weight of a metal hydroxide.

9. The method of claim 7, wherein the coating comprises from about 0.5 to 5% by weight of a crosslinking agent.

10. The method of claim 7, wherein the coating comprises from about 4 to 15% by weight of a wax.

11. The method of claim 1, wherein the coating comprises from about 60 to 95% by weight of said copolymer dispersion containing 35% total solids.

12. The method of claim 11, wherein the coating comprises from about 5 to 40% of said aliphatic polyurethane dispersion containing 33% total solids.

13. The method claim 11, wherein the coating comprises from about 10 to 40% by weight of said hydrogenated hydrocarbon rosin or rosin ester dispersion containing 55% total solids.

14. The method of claim 11, wherein the coating comprises from about 5 to 40% by weight of said amorphous acrylic polymer dispersion containing 35% total solids.

15. A coated polyethylene substrate comprising:

a substrate comprising linear low density polyethylene, said substrate having first and second major surfaces, with at least one of said major surfaces having coated thereon a primer coating for enhancing adhesion of liquid toner thereto, said primer coating comprising a mixture of a copolymer of ethylene and acrylic or methacrylic acid and an adhesion enhancer selected from the group consisting of an aliphatic polyurethane, a hydrogenated hydrocarbon rosin or rosin ester, and an amorphous acrylic polymer.

16. The coated substrate of claim 15 wherein said at least one major surface of said polymer substrate has been treated by a flame treatment or corona discharge treatment prior to applying said primer coating thereto.

17. The coated substrate of claim 15 wherein said primer coating is about 0.3 to about 2 microns thick.

18. The coated substrate of claim 15 wherein said primer coating is from about 0.5 to about 1 microns thick.

19. The coated substrate of claim 15, wherein the polyethylene substrate is from about 0.5 to 13 thousandths of an inch thick.

20. The coated substrate of claim 15, configured as a tote bag, closed on three sides and open on a fourth side.

21. A method of applying a primer coating to a polyethylene substrate for enhancing adhesion of liquid toner thereto, the method comprising:

providing a substrate made from linear low density polyethylene; and applying a primer coating to at least one of the major surfaces of said substrate; the primer coating comprising mixture of a copolymer of ethylene and acrylic or methacrylic acid and an adhesion enhancer selected from the group consisting of an aliphatic polyurethane, a hydrogenated hydrocarbon rosin or rosin ester, and an amorphous acrylic polymer.

22. The method of claim 21 including treating the at least one major surface of said substrate by a flame treatment or corona discharge treatment prior to applying said primer coating.

23. The method of claim 21 including drying the primer coating after applying said coating to the at least one major surface of said substrate.

24. A method of printing a polyethylene substrate, the method comprising:

providing a substrate made from linear low density polyethylene, the substrate having first and second major surfaces, with at least one of the major surfaces having coated thereon a primer coating comprising a mixture of a copolymer of ethylene and acrylic or methacrylic acid and an adhesion enhancer selected from the group consisting of an aliphatic polyurethane, a hydrogenated hydrocarbon rosin or rosin ester, and an amorphous acrylic polymer; and printing the substrate by applying liquid toner from a digital printing apparatus to the coated surface of said polyethylene substrate.

25. The process of claim 24, further comprising forming a tote bag with the printed substrate by cutting the substrate to a desired length, folding the substrate, and closing three sides of the substrate.

* * * * *